(12) United States Patent
Higa

(10) Patent No.: US 8,599,337 B2
(45) Date of Patent: Dec. 3, 2013

(54) LIQUID CRYSTAL DEVICE AND ELECTRONIC APPARATUS

(75) Inventor: Masakatsu Higa, Tottori (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 1212 days.

(21) Appl. No.: 11/984,971

(22) Filed: Nov. 26, 2007

(65) Prior Publication Data

US 2008/0225209 A1 Sep. 18, 2008

(30) Foreign Application Priority Data

Mar. 12, 2007 (JP) .................................. 2007-061334

(51) Int. Cl.
*G02F 1/1335* (2006.01)
*G02F 1/1343* (2006.01)

(52) U.S. Cl.
USPC ............ 349/114; 349/106; 349/110; 349/113; 349/155; 349/156; 349/117; 349/118

(58) Field of Classification Search
USPC .......... 349/114, 106, 110, 117, 155–157, 141
See application file for complete search history.

(56) References Cited

U.S. PATENT DOCUMENTS

| | | | |
|---|---|---|---|
| 7,102,714 B2 * | 9/2006 | Tsuchiya et al. ............... | 349/114 |
| 7,391,484 B2 * | 6/2008 | Kaneko et al. .................. | 349/44 |
| 7,535,533 B2 * | 5/2009 | Lee et al. ........................ | 349/141 |
| 7,738,067 B2 * | 6/2010 | Chen et al. ..................... | 349/155 |
| 7,817,236 B2 * | 10/2010 | Jang et al. ...................... | 349/153 |
| 7,821,612 B2 * | 10/2010 | Koo ................................ | 349/155 |
| 2005/0264731 A1 * | 12/2005 | Itou et al. ....................... | 349/114 |
| 2006/0192912 A1 * | 8/2006 | Itou et al. ....................... | 349/114 |
| 2007/0013773 A1 * | 1/2007 | Tsuchiya et al. ................ | 348/87 |
| 2007/0134881 A1 * | 6/2007 | Ishikawa et al. ............... | 438/303 |
| 2007/0146620 A1 * | 6/2007 | Araki et al. .................... | 349/156 |
| 2007/0182892 A1 * | 8/2007 | Higa et al. ..................... | 349/114 |

FOREIGN PATENT DOCUMENTS

| | | |
|---|---|---|
| JP | A 2004-061849 | 2/2004 |
| JP | A 2004-325822 | 11/2004 |
| JP | A 2004-354507 | 12/2004 |
| JP | A 2005-092047 | 4/2005 |
| JP | A 2005-338256 | 12/2005 |
| JP | A 2006-098861 | 4/2006 |
| JP | A 2006-154118 | 6/2006 |
| JP | A 2006-276108 | 10/2006 |
| JP | A 2007-025187 | 2/2007 |
| JP | A 2007-079355 | 3/2007 |
| KR | 2007-0009475 | 1/2007 |

* cited by examiner

*Primary Examiner* — Huyen Ngo
(74) *Attorney, Agent, or Firm* — K&L Gates LLP

(57) ABSTRACT

A liquid crystal device in which a horizontal electric field is applied to a liquid crystal layer of a transflective type. Spacers are disposed to set a distance between substrates and to prevent deterioration of display quality by eliminating thickness non-uniformity of an alignment layer due to the presence of a retardation layer. Slits are provided in the retardation layer regions to prevent deterioration of display quality by preventing dissolution and flow of an ingredient of the retardation layer to the liquid crystal layer side through the alignment layers.

9 Claims, 8 Drawing Sheets

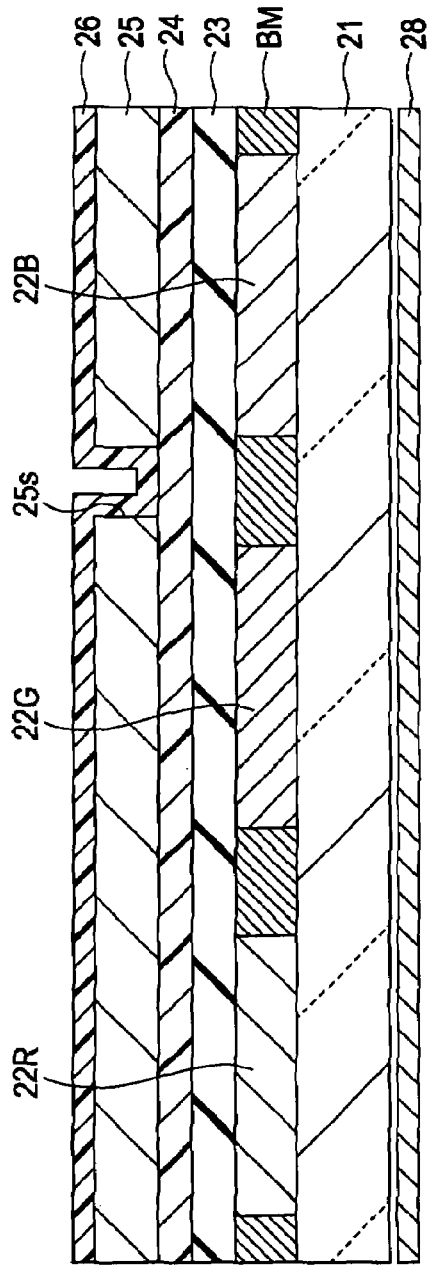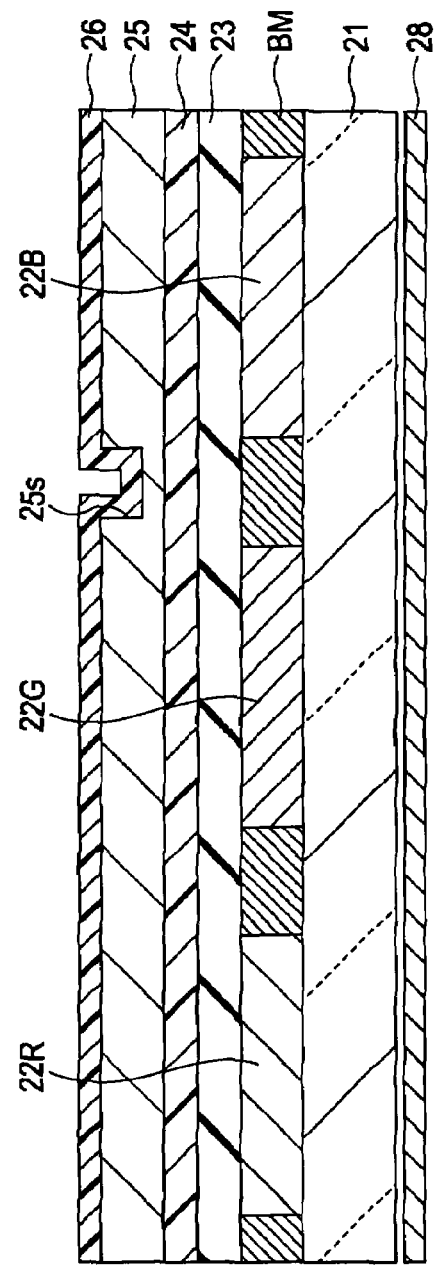
FIG. 5A
FIG. 5B

LIQUID CRYSTAL DEVICE AND ELECTRONIC APPARATUS

The entire disclosure of Japanese Patent Application No. 2007-061334, filed Mar. 12, 2007 is expressly incorporated by reference herein.

BACKGROUND

1. Technical Field

The present invention relates to a liquid crystal device preferably used for displaying various information.

2. Related Art

Currently, a liquid crystal device of a horizontal electric field system represented by an IPS (In-Plane Switching) system and an FFS (Fringe Field Switching) system are preferably used as various display devices such as a mobile apparatus. The horizontal electric field system is a system in which a direction of an electric field applied to liquid crystal is set approximately parallel to a substrate and there is an advantage in that wide viewing angle property can be obtained as compared with a TN (Twisted Nematic) system or the like.

An example in which such a horizontal electric field system which can obtain wide viewing angle property is applied to a transflective liquid crystal device having both display modes of reflective display and transmissive display is disclosed in JP-A-2005-338256 (hereinafter, referred to as Patent Document 1).

In the liquid crystal device described in Patent Document 1, an embedded retardation film is selectively disposed inside a liquid crystal panel of a reflective display unit so that the laminated body of a liquid crystal layer and the embedded retardation film becomes a broadband ¼ wavelength plate.

In the liquid crystal device having the structure disclosed in Patent Document 1, a thickness of the liquid crystal layer in a reflective display area is set smaller than a thickness of the liquid crystal layer in a transmissive display area due to the existence of the embedded retardation film provided at the first substrate side. Accordingly, a spacer for setting a distance between substrates is generally provided at the reflective display area side at which the thickness of the liquid crystal layer is thin.

However, in such a liquid crystal device, the embedded retardation film is formed, for example, by polymerizing and curing the liquid crystal having optical polymerization property. Accordingly, the embedded retardation film is generally soft, so that it is difficult to form the spacer on the embedded retardation film. Even when the spacer can be formed on the retardation film, there is a problem in that it is difficult for the spacer to function as a spacer due to the softness.

Further, in the liquid crystal device, when the embedded retardation film is provided in a raised manner in the reflective display area, a predetermined step is formed between the transmissive display are and the reflective display area at the first substrate side at which a color filter is provided. Herewith, in the manufacturing process of the first substrate, when an alignment layer for setting the alignment of the liquid crystal layer is applied to the transmissive display area and the reflective display area, due to the step, a part of the alignment layer applied on the embedded retardation film positioned in the reflective display area flows into each side of one transmissive display area and the other transmissive display area adjacent each other positioned to sandwich the reflective display area. In this case, it is not necessary that an amount of the alignment layer flowed to the one transmissive display area side and an amount of the alignment layer flowed to the other transmissive display area side become the same. Accordingly, when the amount of the alignment layer flowed to the one transmissive display area and the amount of the alignment layer flowed into the other transmissive display area side become uneven, a transmissive display area in which the thickness of the alignment layer is thick and a transmissive area in which the thickness of the alignment layer is thin exist. This causes thickness non-uniformity of the alignment layer. Consequently, there is a problem in that line display non-uniformity occurs due to the thickness non-uniformity of the alignment layer to deteriorate display quality.

Further, in the liquid crystal device, the thickness of the alignment layer is generally thin. Accordingly, there is a problem in that an ingredient of the embedded retardation film is dissolved to flow to the liquid crystal layer through the alignment layer to deteriorate display quality.

SUMMARY

An advantage of some aspects of the invention is to provide a liquid crystal device which makes it possible to dispose a spacer for setting a distance between substrates, to prevent deterioration of display quality by eliminating thickness non-uniformity of an alignment layer due to the presence of a retardation layer, to prevent deterioration of display quality by preventing dissolution and flow of an ingredient of the retardation layer to the liquid crystal layer side, and the like in the liquid crystal device having a horizontal electric field system of a transflective type, and to provide an electric apparatus using the same.

According to an aspect of the invention, there is provided a liquid crystal device. The liquid crystal device includes a pair of first and second substrates which sandwich a liquid crystal layer. The first substrate includes a first electrode, a second electrode for generating an electric field between with the first electrode, and a reflection layer, and the second substrate includes a plurality of coloring layers and a retardation layer that gives a retardation of ½ wavelength. A transmissive display area for performing transmissive display by transmitting the light introduced into the liquid crystal layer from the first substrate side to the second substrate side and a reflective display area for performing reflective display by reflecting the light introduced into the liquid crystal layer form the second substrate side to the second substrate side by the reflection layer are provided in a sub pixel area corresponding to the area in which the first electrode of the first substrate and the second substrate are overlapped with each other. A thickness of the liquid crystal layer in the transmissive display area is set at least larger than a thickness of the liquid crystal layer in the reflective display area. The liquid crystal layer in the reflective display area gives a retardation of ¼ wavelength and the liquid crystal layer in the transmissive display area gives a retardation of ½ wavelength. A first polarizer having a first optical axis is provided on the first substrate at the side opposite to the liquid crystal layer side and a second polarizer having a second optical axis perpendicular to the first optical axis is provided on the second substrate at the side opposite to the liquid crystal layer side. Any one of the first optical axis of the first polarizer and the second optical axis of the second polarizer is set in parallel to an alignment axis of liquid crystal molecules of the liquid crystal layer. The retardation layer is provided between the liquid crystal layer and the second polarizer and at a position at lease corresponding to the reflective display area. Further, a spacer for setting a distance between the first substrate and the second substrate is provided at any one of the first substrate and the second substrate side and in the area not overlapping with the retardation layer in plan view.

The liquid crystal device is equipped with a pair of a first substrate and a second substrate sandwiching a liquid crystal layer. The first substrate is equipped with a first electrode (for example, pixel electrode) and a second electrode (for example, a common electrode to which a common voltage is applied) for generating an electric field between with the first electrode, and a reflection layer having light reflectivity such as, for example, aluminum. On the other hand, the second substrate is equipped with a coloring layer having a plurality of colors, a retardation layer that gives a retardation of ½ wavelength. Herein the retardation layer is formed by polymerizing and curing the liquid crystal having optical polymerization property and is preferable to be formed by high molecular liquid crystal as liquid crystal monomer polymer. In a preferred example, the electric field should be a fringe field having a strong electric field component in the direction approximately parallel to the substrate surface of the first substrate when driving the liquid crystal layer. Herewith, a liquid crystal device of an FFS system as an example of a horizontal electric field system can be constituted. Further, a transmissive display area for performing transmissive display by transmitting the light introduced into the liquid crystal layer from the first substrate side to the second substrate side and a reflective display area for performing reflective display by reflecting the light introduced into the liquid crystal layer from the second substrate side to the second substrate side by the reflection layer are provided in the sub pixel area corresponding to the area in which the first electrode of the first substrate and the second substrate are overlapped with each other. Then, the thickness of the liquid crystal layer in the transmissive display area is at least set larger than the thickness of the liquid crystal layer in the reflective display area, and the liquid crystal layer in the reflective display area gives a retardation of ¼ wavelength and the liquid crystal layer in the transmissive display area gives a retardation of ½ wavelength. Herewith, the liquid crystal device constitutes a transflective type liquid crystal device having a multi gap structure.

Further, a first polarizer having a first optical axis (for example, polarization axis) is provided on the first substrate at the side opposite to the liquid crystal layer side and a second polarizer having a second optical axis (for example, polarization axis) perpendicular to the first optical axis is provided on the second substrate at the side opposite to the liquid crystal layer side. Any one of the first optical axis of the first polarizer and the second optical axis of the second polarizer is set in parallel to the alignment axis of the liquid crystal molecules of the liquid crystal layer.

Herein, the retardation layer is formed by polymerizing and curing the liquid crystal having optical polymerization property as described above. Accordingly, the retardation layer is generally soft, so that it is difficult to form the spacer on the retardation layer. Even when the spacer can be formed on the retardation layer, it is difficult for the spacer to function as a spacer due to the softness.

In this regard, in the liquid crystal device, the retardation layer is provided between the liquid crystal layer and the second polarizer and at a position at least corresponding to the reflective display area and a spacer for setting a distance between the first substrate and the second substrate is provided at any one of the first substrate and the second substrate side and in the area not overlapping with the soft retardation layer in plan view.

Herewith, the spacer can be surely disposed without difficulty in manufacturing. Further, it becomes possible that the spacer functions as a spacer. In a preferred example, it is preferable that the spacer is provided at the second substrate side. By providing the spacer to the second substrate side, it becomes possible to surely provide the spacer at a position not overlapping with the retardation layer in plan view in manufacturing process.

According to an aspect of the liquid crystal device, it is preferable that the spacer is provided in an area which enables the spacer to be surly supported, for example, in an area in which the thickness of the liquid crystal layer is larger than the thickness of the liquid crystal layer in the reflective display area.

According to another aspect of the liquid crystal device, a plurality of the sub pixel areas are provided in a matrix manner, a light shielding layer is provided at the second substrate side and at least between the sub pixel areas adjacent each other in a row direction, and the spacer is provided at a position overlapping with the light shielding layer in plan view. Herewith, should light leakage occur due to the spacer, the light leakage is shielded by the light shielding layer. Accordingly, deterioration of display quality due to the spacer can be prevented.

According to another aspect of the liquid crystal device, the retardation layer has a slit at a position corresponding to between the reflective display area provided in any of the sub pixel area and the other reflective display area provided in the other sub pixel area adjacent each other in a predetermined direction with respect to the any of the sub pixel area. In a preferred example, the slit does not penetrate in the thickness direction of the retardation layer in the retardation layer.

Herein, as a comparative example, the case where the slit (groove) is not formed in the retardation layer will be described. As described above, the retardation layer is provided at a position at least corresponding to the reflective display area. That is, the retardation layer is provided in a raised manner at least in the reflection display area. Accordingly, a predetermined step is formed between the transmissive display area and the reflective display area at the second substrate side. Herewith, in the manufacturing process of the second substrate, when an alignment layer for setting the alignment of the liquid crystal layer is applied to the transmissive display area and the reflective display area, a part of the alignment layer applied on the retardant layer positioned in the reflective display area flows into each side of one transmissive display area and the other transmissive display area adjacent each other in a predetermined direction (for example, extending direction of a source line) with respect to the reflection display area due to the step. In this case, it is not necessary that the amount of the alignment layer flowed to one transmissive display area side and the amount of the alignment layer flowed to the other transmissive display area side become the same. Accordingly, when the amount of the alignment layer flowed into one transmissive display area and the amount of the alignment layer flowed into the other transmissive display area become uneven, the transmissive display area in which the thickness of the alignment layer is thick and the transmissive display area in which the thickness of the alignment layer is thin exist in the second substrate. Accordingly, thickness non-uniformity is generated in the alignment layer. Consequently, in the comparative example, there is a problem in that line display non-uniformity occurs due to the thickness non-uniformity of the alignment layer.

In this regard, in the aspect, the retardation layer has a slit at a position corresponding to between the reflective display area provided in any of the sub pixel area and the other reflective display area provided in the other sub pixel area adjacent each other in a predetermined direction with respect to the any of the sub pixel area (for example, the extending direction of a second wiring of a gate line or a common wiring described below extending in the direction perpendicular to the extending direction of the source line). Consequently, should the amount of the alignment layer flowed to one transmissive display area side and the amount of the alignment layer flowed to the other transmissive display area side become uneven when forming the alignment layer at the second substrate side, the alignment layer flows from one (or the other) transmissive display area side at which the flowed amount of the alignment layer is large to the other (or one) transmissive display are side at which the flowed amount of the alignment layer is small through the slit provided in the retardation layer. Consequently, the thickness of the alignment layer formed at one transmissive display area side and the thickness of the alignment layer formed at the other transmissive display area side become even. Accordingly, occurrence of thickness non-uniformity of the alignment layer can be prevented by the operation of the silt. This makes it possible to prevent occurrence of display non-uniformity.

In a preferred example, it is preferable that the slit is provided between some of the sub pixel areas adjacent each other in the predetermined direction and the slit is not provided between some of the sub pixel areas adjacent each other in the predetermined direction in the retardation layer.

As described above, the spacer is provided in the area not overlapping with the soft retardation layer in plan view at the second substrate side. Herein, when the spacer is provided near the slit of the retardation layer or on the extended line in the extending direction of the slit, there is a fear in that the flow of the alignment layer through the slit between one transmissive display area and the other transmissive display area provided at the position to sandwich the reflection display area may be stopped when forming the alignment layer for setting the alignment of the liquid crystal layer at the second substrate side.

Consequently, in order to prevent the occurrence of such a disadvantage, according to another aspect of the liquid crystal device, the spacer is provided at the position most apart from the slit in any of the sub pixel area. In a preferred example, it is preferable that the spacer is not positioned on the extended line in the extending direction of the slit. Herewith, when forming the alignment layer, it is prevented that the spacer stops the flow of the alignment layer through the silt of the retardation layer. As a result, occurrence of thickness non-uniformity of the alignment layer can be prevented.

According to another aspect of the liquid crystal device, a protection layer covering the retardation layer is provided at least between the retardation layer and the liquid crystal layer, and the protection layer has a slit at a position corresponding to between the reflective display area provided in any of the sub pixel area and the other reflective display area provided in the other sub pixel area adjacent each other in a predetermined direction with respect to the any of the sub pixel area.

Generally, the thickness of the alignment layer formed on the retardation layer is thin, so that there is a fear in that an ingredient contained in the retardation layer is dissolved to flow to the liquid crystal layer side through the alignment layer due to the thickness to deteriorate display quality. Further, the retardation layer is formed by polymerizing and curing the liquid crystal having optical polymerization property as described above, so that the retardation layer is generally soft. Accordingly, the retardation layer is extremely week against mechanical impact or the like generated when subjecting the surface of the alignment layer to a rubbing process.

In this regard, in the aspect, a protection layer for covering the retardation layer is provided at least between the retardation layer and the liquid crystal layer. Herein, as for the forming material of the protection layer, for example, a transparent resin such as acrylic resin or the like is included. According to the structure, by the operation of the protection layer as a barrier, it is prevented that an ingredient contained in the retardation layer is dissolved to flow to the liquid crystal layer side through the alignment layer. This enables to prevent deterioration of display quality. Further, by the operation of the protection layer as a reinforcement layer, the retardation layer can be protected from mechanical impact or the like generated when subjecting the surface of the alignment layer to a rubbing process.

Further, in the aspect, the protection layer has a slit at the position corresponding to between the reflective display area provided in any of the sub pixel area and the other reflective display area provided in the other sub pixel area adjacent each other in a predetermined direction with respect to the any of the sub pixel area (for example, the extending direction of a second wiring of a gate line or a common wiring described below extending in the direction perpendicular to the extending direction of the source line). Consequently, should the amount of the alignment layer flowed to one transmissive display area side and the amount of the alignment layer flowed to the other transmissive display area side become uneven when forming the alignment layer at the second substrate side, the alignment layer flows from one (or the other) transmissive display area side at which the flowed amount of the alignment layer is large to the other (or one) transmissive display are side at which the flowed amount of the alignment layer is small through the slit provided in the protection layer. Consequently, the thickness of the alignment layer formed at one transmissive display area side and the thickness of the alignment layer formed at the other transmissive display area side become even. Accordingly, occurrence of thickness non-uniformity of the alignment layer can be prevented by the operation of the silt of the protection layer. This makes it possible to prevent occurrence of display non-uniformity.

In a preferred example, it is preferable that the slit is provided between some of the sub pixel areas adjacent each other in the predetermined direction and the slit is not provided between the some of the sub pixel areas adjacent each other in the predetermined direction in the protection layer.

According to another aspect of the liquid crystal device, the spacer is provided at the position most apart from the slit in any of the sup pixel area. In a preferred example, it is preferable that the spacer is not positioned on the extended line in the extending direction of the slit. Herewith, when forming the alignment layer, it can be prevented that the spacer stops the flow of the alignment layer through the slit of the protection layer between the transmissive display areas adjacent each other. As a result, occurrence of thickness non-uniformity of the alignment layer can be prevented.

According to another aspect of the liquid crystal device, it is preferable that the slit does not penetrate in the thickness direction of the protection layer in the protection layer. Herewith, the protection layer as a barrier exists between the alignment layer and the retardation layer corresponding to the position of the slit. This further prevents that an ingredient contained in the retardation layer is dissolved to flow to the liquid crystal layer side through the alignment layer.

According to another aspect of the invention, there is provided a liquid crystal device. The liquid crystal device includes a pair of first and second substrates which sandwich a liquid crystal layer. The first substrate includes a first electrode, a second electrode for generating an electric field between with the first electrode, and a reflection layer, and the second substrate includes a plurality of coloring layers and a retardation layer that gives a retardation of ½ wavelength. A transmissive display area for performing transmissive display by transmitting the light introduced into the liquid crystal layer from the first substrate side to the second substrate side and a reflective display area for performing reflective display by reflecting the light introduced into the liquid crystal layer form the second substrate side to the second substrate side by the reflection layer are provided in a sub pixel area corresponding to the area in which the first electrode of the first substrate and the second substrate are overlapped with each other. A thickness of the liquid crystal layer in the transmissive display area is set at least larger than a thickness of the liquid-crystal layer in the reflective display area. The liquid crystal layer in the reflective display area gives a retardation of ¼ wavelength and the liquid crystal layer in the transmissive display area gives a retardation of ½ wavelength. A first polarizer having a first optical axis is provided on the first substrate at the side opposite to the liquid crystal layer side and a second polarizer having a second optical axis perpendicular to the first optical axis is provided on the second substrate at the side opposite to the liquid crystal layer side. Any one of the first optical axis of the first polarizer and the second optical axis of the second polarizer is set in parallel to an alignment axis of liquid crystal molecules of the liquid crystal layer. The retardation layer is provided between the liquid crystal layer and the second polarizer and at a position at least corresponding to the reflective display area. Further, a layer positioned in the reflective display area and provided between the second substrate and the liquid crystal layer includes a slit at a position corresponding to between the reflective display area provided in any of the sub pixel area and the other reflective display area provided in the other sub pixel area adjacent each other in a predetermined direction with respect to the any of the sub pixel area.

The liquid crystal device is equipped with a pair of a first substrate and a second substrate sandwiching a liquid crystal layer. The first substrate is equipped with a first electrode (for example, pixel electrode) and a second electrode (for example, a common electrode to which a common voltage is applied) for generating an electric field between with the first electrode, and a reflection layer having light reflectivity such as, for example, aluminum. On the other hand, the second substrate is equipped with a coloring layer having a plurality of colors, a retardation layer that gives a retardation of ½ wavelength. Herein the retardation layer is formed by polymerizing and curing the liquid crystal having optical polymerization property and is preferable to be formed by high molecular liquid crystal as liquid crystal monomer polymer. In a preferred example, the electric field should be a fringe field having a strong electric field component in the direction approximately parallel to the substrate surface of the first substrate when driving the liquid crystal layer. Herewith, a liquid crystal device of an FFS system as an example of a horizontal electric field system can be constituted. Further, a transmissive display area for performing transmissive display by transmitting the light introduced into the liquid crystal layer from the first substrate side to the second substrate side and a reflective display area for performing reflective display by reflecting the light introduced into the liquid crystal layer from the second substrate side to the second substrate side by the reflection layer are provided in the sub pixel area corresponding to the area in which the first electrode of the first substrate and the second substrate are overlapped with each other. Then, the thickness of the liquid crystal layer in the transmissive display area is at least set larger than the thickness of the liquid crystal layer in the reflective display area, and the liquid crystal layer in the reflective display area gives a retardation of ¼ wavelength and the liquid crystal layer in the transmissive display area gives a retardation of ½ wavelength. Herewith, the liquid crystal device constitutes a transflective type liquid crystal device having a multi gap structure.

Further, a first polarizer having a first optical axis (for example, polarization axis) is provided on the first substrate at the side opposite to the liquid crystal layer side and a second polarizer having a second optical axis (for example, polarization axis) perpendicular to the first optical axis is provided on the second substrate at the side opposite to the liquid crystal layer side. Any one of the first optical axis of the first polarizer and the second optical axis of the second polarizer is set in parallel to the alignment axis of the liquid crystal molecules of the liquid crystal layer.

In particular, in the aspect, the retardation layer is provided between the liquid crystal layer and the second polarizer and at the position corresponding to at least the reflective display area. A layer (for example, the retardation layer or a protection layer provided between the retardation layer and the liquid crystal layer) provided between the second substrate and the liquid crystal layer positioned in the reflective display area has a slit at a position corresponding to between the reflective display area provided in any of the sub pixel area and the other reflective display area provided in the other sub pixel area adjacent each other in a predetermined direction with respect to the any of the sub pixel area (for example, the extending direction of a second wiring of a gate line or a common wiring described below extending in the direction perpendicular to the extending direction of the source line).

Consequently, should the amount of the alignment layer flowed to one transmissive display area side and the amount of the alignment layer flowed to the other transmissive display area side become uneven when forming the alignment layer at the second substrate side, the alignment layer flows from one (or the other) transmissive display area side at which the flowed amount of the alignment layer is large to the other (or one) transmissive display are side at which the flowed amount of the alignment layer is small through the slit provided in the layer provided between the second substrate and the liquid crystal layer positioned in the reflective display area. Consequently, the thickness of the alignment layer formed at one transmissive display area side and the thickness of the alignment layer formed at the other transmissive display area side become even. Accordingly, occurrence of thickness non-uniformity of the alignment layer can be prevented by the operation of the silt. This makes it possible to prevent occurrence of display non-uniformity.

According to a still another aspect of the invention, there is provided an electronic apparatus equipped with the liquid crystal device as a display unit.

BRIEF DESCRIPTION OF THE DRAWINGS

The invention will be described with reference to the accompanying drawings, wherein like numbers reference like elements.

FIGS. 5A and 5B are each a cross sectional view corresponding to a reflective display area of a color filter substrate of the first embodiment.

DESCRIPTION OF EXEMPLARY EMBODIMENTS

Hereinafter, the best mode for carrying out the invention will be described with reference to the accompanying drawings.

First Embodiment

Structure of Liquid Crystal Device

First, a planar structure focusing on an electrode and a wiring structure of a liquid crystal device according to a first embodiment of the invention will be described with reference to FIG. 1.

Figure 1:
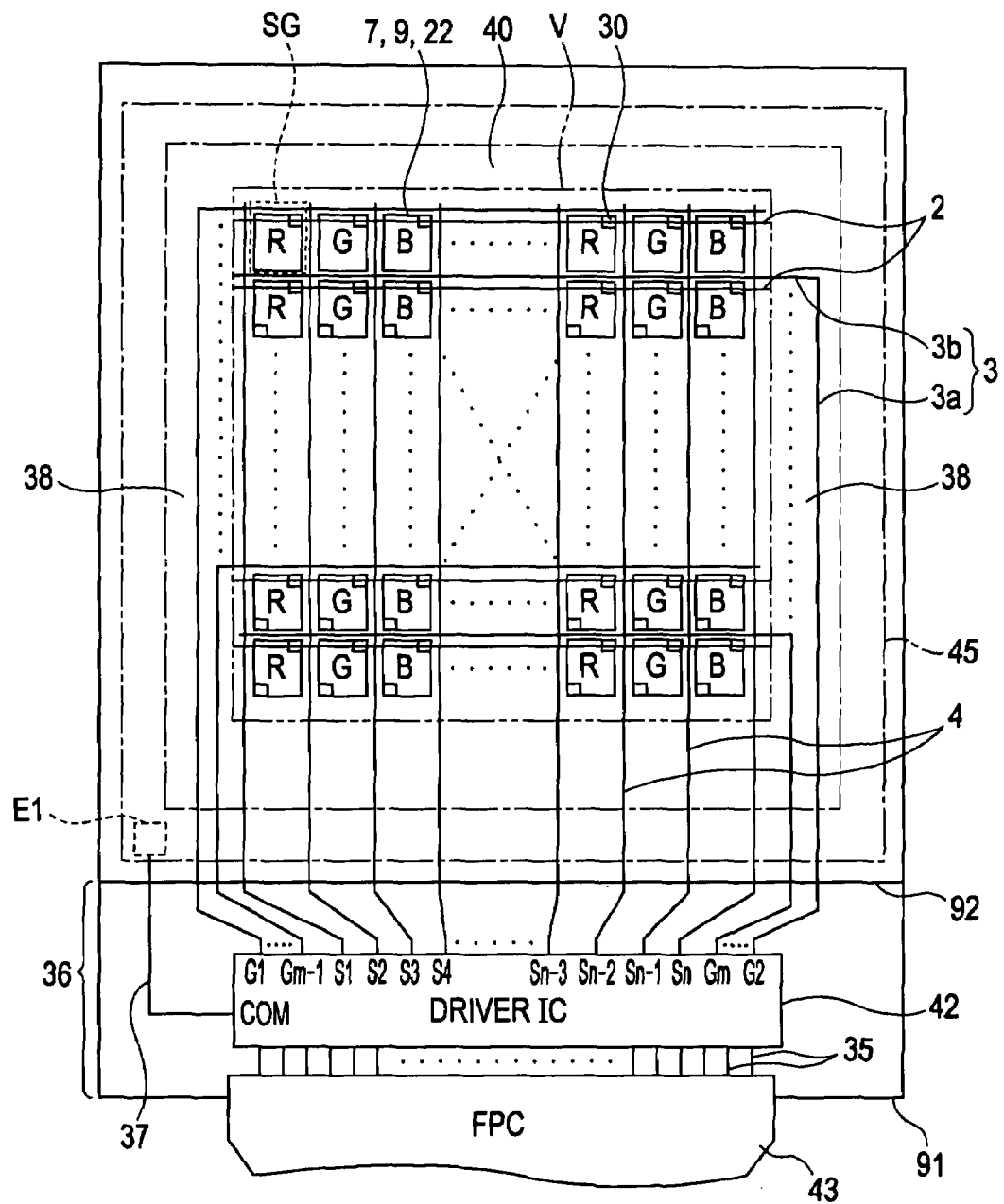
FIG. 1 is a plan view showing an electrode and a wiring structure of a liquid crystal device according to a first embodiment of the invention.

FIG. 1 is a plan view schematically showing an electrode and a wiring structure of the liquid crystal device according to the first embodiment. In FIG. 1, a color filter substrate 92 and an element substrate 91 are respectively disposed at the front side of the paper surface (observation side) and the rear side of the paper surface. Further, in FIG. 1, the overlapping area of the area corresponding to each of coloring layers 22 of R, G, B three colors having a rectangular plan shape provided at the color filter substrate 92 side and each pixel electrode 9 provided at the element substrate 91 side shows one sub pixel area (a sub pixel area) SG which becomes the minimum unit for display. The area in which a plurality of sub pixel areas SG are aligned in a matrix manner is a viewing area V (the area surrounded by two dot chain line) in which images such as characters, numbers, and figures are displayed. The area outside the viewing area V is a frame area 38 which does not contribute for display.

The element substrate 91 and the color filter substrate 92 oppositely disposed thereto are stuck together via a sealing material 45 having a frame shape and a liquid crystal layer 40 is formed by enclosing liquid crystal showing a homogeneous alignment in the area separated by the sealing material 45 to constitute the liquid crystal device 100.

Herein, the liquid crystal device 100 is a liquid crystal device of an FFS (Fringe Field Switching) system as an example of a horizontal electric field system which generates a fringe filed (electric field E) in the direction approximately parallel to the substrate surface of the element substrate 91 to control the alignment of the liquid crystal molecules. Further, the liquid crystal device 100 is a transflective type liquid crystal device having a reflective display mode for performing reflective display by using the external light under a bright light and a transmissive display mode for performing transmissive display by using a light source such as a backlight under a dark light. Further, the liquid crystal device 100 is a liquid crystal device for color display constituted by using the coloring layers 22 of R, G, B three colors and is a liquid crystal device of an active matrix driving system using an α Si-type TFT (Thin Film Transistor) element 30 of as a switching element.

First, the planar structure focusing on an electrode and a wiring structure of the element substrate 91 will be described.

The element substrate 91 mainly includes a plurality of source lines 4, a plurality of gate lines 3, a plurality of common wirings 2, a wiring 37, a plurality of α Si-type TFT element 30, a plurality of common electrodes 7, a plurality of pixel electrodes 9, a driver IC 42, an external connection wiring 35, and an FPC 43.

The element substrate 91 has a flared area 36 flaring outwardly from one side of the color filter substrate 92. The driver IC 42 for driving liquid crystal is mounted on the flared area 36. Each electrode (omitted in FIG. 1) at input side of the driver IC 42 is electrically connected to one end of each external connection wiring 35 and the other end of each external connection wiring 35 is electrically connected to each electrode (omitted in FIG. 1) of the FPC 43. One end of the FPC 43 (omitted in FIG. 1) is electrically connected to an electronic apparatus described below.

Each source line 4 is formed to extend from the flared area 36 to the viewing area V at an appropriate interval in the longitudinal direction of the driver IC 42. One end of each source line 4 is electrically connected to each electrode (omitted in FIG. 1) of output side of the driver IC 42.

Each gate line 3 is equipped with a first wiring 3a formed to extend from the flared area 36 to the viewing area V at an appropriate distance in the longitudinal direction of the driver IC 42 and a second wiring 3b formed to extend from the terminal of the first wiring 3a into the viewing area V. One end of the first wiring 3a of each gate line 3 is electrically connected to each electrode of the driver IC 42 at the output side (omitted in FIG. 1).

Each common wiring 2 is provided to correspond to each gate line 3 and formed to extend in the same direction at a fixed distance with respect to the second wiring 3b of the each gate line 3. Each common wiring 2 is electrically connected to a wiring 37 at, for example, a position E1 which is a corner of the sealing material 45. The wiring 37 is electrically connected to an output electrode corresponding to the COM of the driver IC 42.

Each α Si-type TFT element 30 is provided so as to correspond to the crossing position of each source line 4 and the second wiring line 3b of each gate line 3 and electrically connected to each source line 4 and each gate line 3.

Each common electrode 7 is provided so as to correspond to each sub pixel area SG and is electrically connected to the corresponding each common wiring 2. Consequently, a common electric potential is applied to each common electrode 7 from the output electrode corresponding to the COM of the driver IC 42 via the corresponding each common wiring 2.

Each pixel electrode 9 is provided so as to correspond to each sub pixel area SG and, each pixel electrode 9 is electrically connected to the corresponding each α Si-type TFT element 30.

Next, a planar structure of the color filter substrate 92 will be described.

The color filter substrate 92 is called as a light shielding layer formed by a black resin which shields light (generally, called as "black matrix" and hereinafter, simply abbreviated as "BM") and equipped with the coloring layers 22 of R, G, B three colors or the like. Note that in the following description, when indicating the coloring layer regardless of color, the coloring layer is simply referred to as "coloring layer 22" and when indicating the coloring layer to distinguish the color, the coloring layer is referred to as "coloring layer 22 R" or the like.

The BM is formed at the position to block out each sub pixel area SG, the position corresponding to each α Si-type TFT element 30, or the lie. Note that, the BM is not necessarily formed by a black resin and may be formed by a metal film having a function for shielding light. The coloring layer 22 of each color of R, G, B is provided so as to correspond to each sub pixel area SG. In the embodiment, the coloring layers 22 are aligned in the extending direction of the second wiring 3b of the gate line 3 in the order of R, G, B. However, the alignment order is not specifically limited.

The liquid crystal device 100 having the above structure is operated as described below when driving.

First, the source line 4 for supplying an image signal is electrically connected to the source electrode 30s (see FIG. 2) of the α Si-type TFT element 30 and the pixel electrode 9 is electrically connected to the drain electrode 30d (see FIG. 2) of the α Si-type TFT element 30. Then the gate line 3 is electrically connected to the gate electrode (omitted in the drawings) of the α Si-type TFT element 30. Each of image signals S1, S2, . . . , Sn supplied from the source lines 4 is written at predetermined timings by closing the switch of the α Si-type TFT element 30 which is a switching element for a predetermined period. The image signals S1, S2, . . . , Sn may be line sequentially supplied in this order or may be supplied group by group to a plurality of mutually adjacent gate lines 32. Further, the gate signals G1, G2, . . . , Gm are line sequentially applied in this order by pulse to the gate line 3 at predetermined timings. Herewith, the alignment state of the liquid crystal molecules of the liquid crystal layer 40 is controlled and a display image is viewed by the observer.

Pixel Structure

Figure 2:
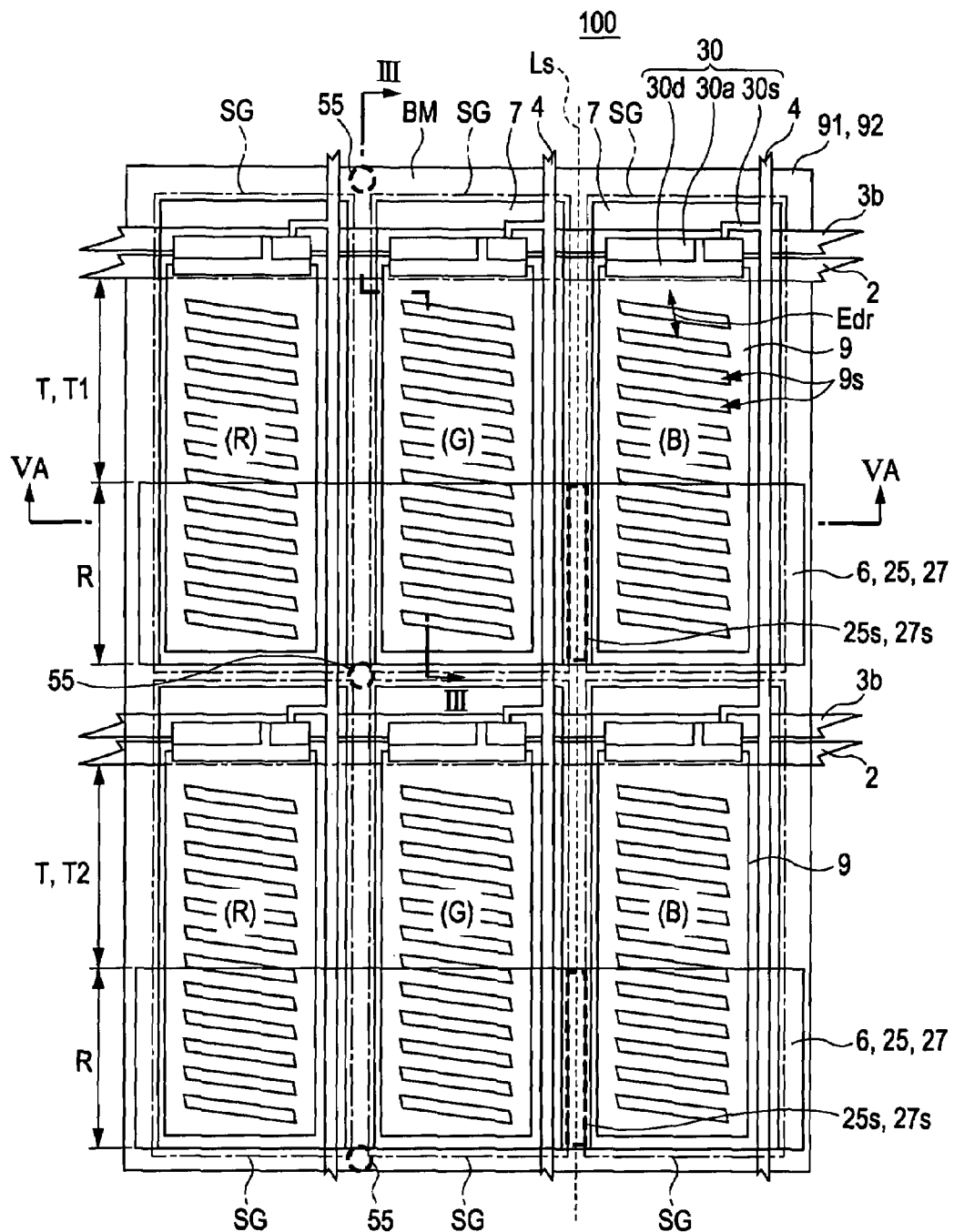
FIG. 2 is a plan view showing a pixel structure of the liquid crystal device of the first embodiment.

Next, a planar pixel structure of the liquid crystal device 100 according to the first embodiment will be described with reference to FIG. 2. FIG. 2 is an enlarged plan view showing a main portion of a pixel structure of the liquid crystal device 100.

One sub pixel area SG corresponds to the overlapping area of the pixel electrode 9 of the element substrate 91 and the coloring area 22 of the color filter substrate 92. A transmissive display area T for performing transmissive display by transmitting the illumination light introduced from a backlight 14 (see FIG. 3) at the element substrate 91 side to the color filter substrate 92 side and a reflective display area R for performing reflective display by reflecting the light introduced from the color filter substrate 92 side to the color filter substrate 92 side by a reflection layer 6 (see FIG. 3) are provided in one sub pixel area SG.

A planar pixel structure at the element substrate 91 side will be described below.

The source line 4, and the second wiring 3b of the gate line 3 and the common wiring 2 extend in the direction perpendicular to each other. The α Si-type TFT element 30 is provided so as to correspond to the crossing position of the source line 4 and the second wiring 3b of the gate line 3 or the common wiring 2. Herein, the α Si-type TFT element 30 includes a gate electrode (omitted in FIG. 2) constituting a part of the gate line 3, a gate insulating layer (omitted in FIG. 2) formed on the gate electrode, an amorphous silicon layer (α-Si layer) 30a formed on the gate insulating layer, a source electrode 30s branched from the main line of the source line 4 to the side of the second wiring 3b of the gate line 3 and electrically connected to the α-Si layer 30a, a drain electrode 30d disposed at a fixed distance to the source electrode 30s and electrically connected to the α-Si layer 30a. A reflection layer 6 having light reflectivity such as aluminum is provided at the position corresponding to the reflective display area R. The common electrode 7 is provided so as to correspond within one sub pixel area SG and electrically connected to the corresponding common wiring 2 via a contact hole (omitted in FIG. 2) provided in a first insulating layer 5. The pixel electrode 9 is provided so as to correspond within one pixel area SG and overlapping with the common electrode 7 in plan view via a second insulating layer 8 (see FIG. 3). The pixel electrode 9 is electrically connected to the drain electrode 30d of the α-Si type TFT element 30 via contact holes (omitted in FIG. 2) provided in each of the second insulating layer 8 and the first insulating layer 5 of FIG. 3. Further, the pixel electrode 9 has a plurality of slits 9s each having a parallelogram shape extending in the direction perpendicular to the source line 4. Each of the slits 9s is provided in the extending direction of the source line 4 at a fixed distance.

Further, a planar structure of the color filter substrate 92 corresponding to the planar pixel structure of the element substrate 91 will be described below.

Each of the coloring layers 22R, 22G, 22B is provided so as to correspond within one sub pixel area SG. The coloring layers 22R, 22G, 22B are disposed along the extending direction of the second wiring 3b of the gate line 3 in this order. A retardation layer 25 (also see FIG. 3) is provided at the position corresponding to the reflective display area R.

Figure 3:
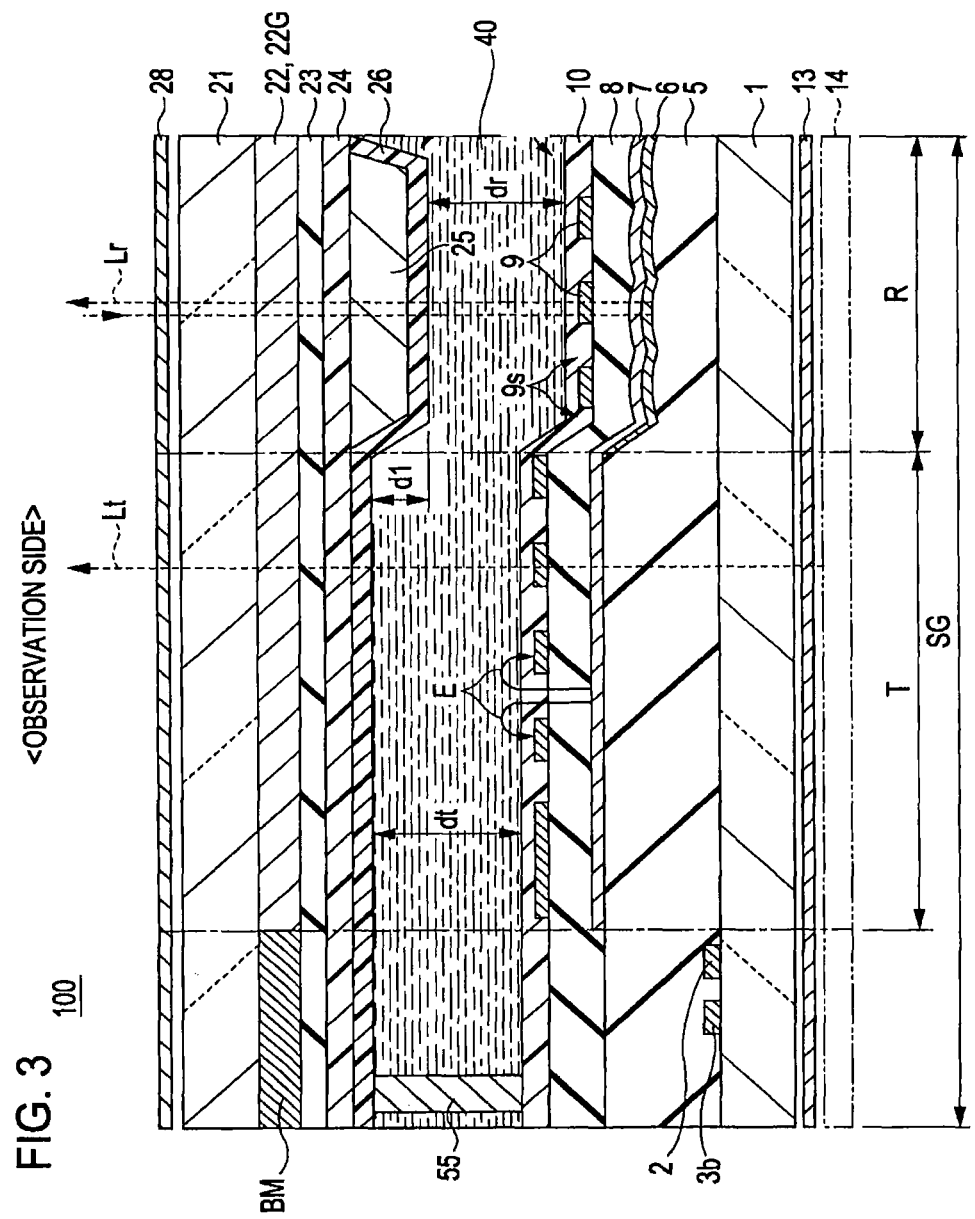
FIG. 3 is a cross sectional view showing a cross sectional structure of one sub pixel area of the liquid crystal device according to the first embodiment.

Next, a cross sectional structure of one sub pixel area SG of the liquid crystal device 100 will be described with reference to FIG. 3. FIG. 3 is a cross sectional view showing a cross sectional structure of one sub pixel area SG taken along the line III-III of FIG. 2.

First, the cross sectional structure of the element substrate 91 shown in FIG. 3 will be described below.

The element substrate 91 includes a first substrate 1, the second wiring 3b of the gate wiring 3 and the common wiring 2 formed on the first substrate 1, the first insulating layer (interlayer insulation film) covering the second wiring 3b of the gate wiring 3 and the common wiring 2, the reflection layer 6 formed on the first insulating layer 5 in the reflective display area R, the common electrode 7 formed on the reflection layer 6 in the reflective display area R and the first insulating layer 5 in the transmissive display area T, the second insulating layer 8 provided at the position covering the common electrode 7, the pixel electrode 9 provided on the second insulating layer 8, and an alignment layer 10 provided at the position covering the pixel electrode 9.

The first substrate 1 is formed by a translucent material such as quart or glass. The first insulating layer 5 is formed by a transparent material having insulation properties such as an acrylic resin. Fine irregularities for scattering light are formed on the first insulating layer 5 positioned in the reflective display area R. The reflection layer 6 is formed on the first insulating layer 5 in which the fine irregularities are formed, so that the reflection layer 6 has a shape reflecting the shape. Consequently, the light reflected by the reflection layer 6 is moderately scattered to the observation side. The second insulating layer 8 is formed by a transparent material having insulation properties such as silicon nitride (SiN). The common electrode 7 and the pixel electrode 9 are formed by a transparent electrical conducting material such as ITO (Indium-Tin-Oxide). The common electrode 7 and the pixel electrode 9 are overlapped with each other in plan view. An electric field E is formed between the common electrode 7 and the pixel electrode 9 via the slits 9s when applying a voltage to the liquid crystal layer 40. However, the electric field E is warped into an arch shape by the second insulating layer 8 and is passed through the liquid crystal layer 40 and the alignment of the liquid crystal molecules is controlled. The alignment layer 10 is formed by an organic material such as polyimide resin having horizontal orientation property and rubbing process is subjected on the surface. Accordingly, the alignment layer 10 has a role to align the liquid crystal molecules in a predetermined direction. Note that a first polarizer 13 is disposed on the element substrate 91 at the side opposite to the liquid crystal layer 40 side and a back light 14 as an illumination device is disposed outside the first polarizer 13.

Next, a cross sectional structure of the color filter substrate 92 shown in FIG. 3 will be described below.

The color filter substrate 92 includes a second substrate 21, the coloring layer 22 (in FIG. 3, coloring layer 22G) formed on the second substrate 21, an insulating layer (overcoat layer) 23 formed on the coloring layer 22, a first alignment layer 24 formed on the insulating layer 23, the retardation layer 25 formed on the first alignment layer 24 in the reflective display area R, a second alignment layer 26 formed on each of the insulating layer 23 in the transmissive display area T and the retardation layer 25 in the reflective display area R, and a columnar spacer 55 formed on the second alignment layer 26.

The second substrate 21 is formed by a translucent material such as quart or glass. The insulating layer 23 is formed by a transparent material having insulation properties such as an acrylic resin and has a function to protect the coloring layer 22 so as not to be eroded and polluted by an agent or the like used in the manufacturing process of the liquid crystal devise 100. The first alignment layer 24 is formed by an organic material such as polyimide resin having horizontal orientation property and rubbing process is subjected on the surface. The first alignment layer 24 has a function to determine the slow axis direction of the retardation layer 25. The retardation layer 25 is formed by polymerizing and curing the liquid crystal having optical polymerization property and formed by high molecular liquid crystal as liquid crystal monomer polymer. Further the retardation layer 25 gives a retardation of ½ wavelength and has a thickness that satisfies the relation of dt>dr if the thickness of the liquid crystal layer 40 in the transmissive display area T is dt and the thickness of the liquid crystal layer 40 in the reflective display area R is dr with the first insulating layer (interlayer insulation film) 5 of the element substrate 91 and the columnar spacer 55. In the example, the thickness dt of the liquid crystal layer 40 in the transmissive display area T and the thickness dr of the liquid crystal layer 40 in the reflective display area R are relatively determined so that the retardation of the liquid crystal layer 40 in the transmissive display area T is set to ½ wavelength and the retardation of the liquid crystal layer 40 in the reflective display area R is set to ¼ wavelength. Herewith, so called a multi gap structure is formed. Further, a slit (groove) 25s is provided at a predetermined position of the retardation layer 25 in order to prevent display non-uniformity caused by thickness non-uniformity of the second alignment layer 26. This point will be described below. The second alignment layer 26 is formed by an organic material such as polyimide resin having horizontal orientation property and rubbing process is subjected on the surface. Accordingly, the second alignment layer 26 has a role to align the liquid crystal molecules in a predetermined direction. The columnar spacer 55 is formed by a transparent resin such as polyimide resin and has a function to set the distance between the element substrate 91 and the color filter substrate 92 to a fixed distance, specifically has a function to set the relation of the thickness dt of the liquid crystal layer 40 in the transmittance area T and the thickness dr of the liquid crystal layer 40 in the reflective display area R to dt>dr. Note that a second polarizer 28 is disposed on the color filter substrate 92 at the side opposite to the liquid crystal layer 40.

Next, relations of an axis of the liquid crystal molecules in the alignment direction, polarization axes of the polarizers, a slow axis of the retardation layer, and the like in the liquid crystal device 100 will be described with reference to FIG. 4.

Figure 4:
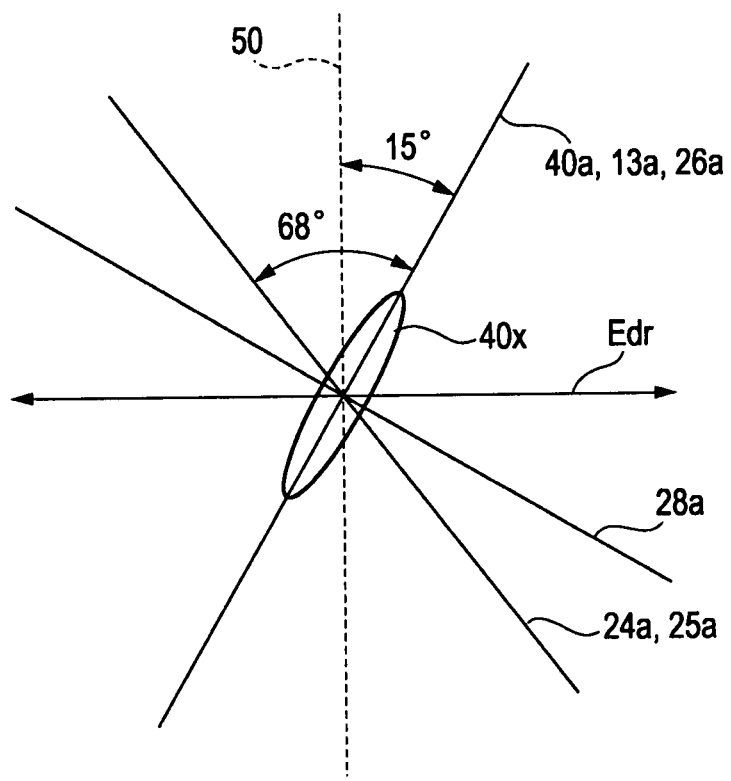
FIG. 4 is a diagram showing a relation of optical axis of each element of the liquid crystal device according to the first embodiment.

FIG. 4 is a diagram schematically showing relations of a direction Edr of the electric field E, an axis 40a of the liquid crystal molecules 40x in the alignment direction (hereinafter, referred to as "liquid crystal alignment axis 40a"), a first polarization axis 13a of the first polarizer 13, a second polarization axis 28a of the second polarizer 28, a slow axis 25a of the retardation layer 25, a rubbing direction 24a of the first alignment layer 24, and a rubbing direction 26a of the second alignment layer 26. In FIG. 4, the straight line 50 shown by the dotted line is a reference line showing the direction parallel to the longitudinal direction (or long axis direction) of the slits 9s of the pixel electrode 9.

The angle made by the direction Edr of the electric field E (also see FIG. 3) and the reference line 50 is set to 90 degrees. Accordingly, the direction Edr of the electric field E is set in parallel to the short side direction (or short axis direction) of the slit 9s of the pixel electrode 9. The liquid crystal alignment axis 40a, the first polarization axis 13a of the first polarizer 13, and the rubbing direction 26a of the second alignment layer 26 are set in parallel to each other and the angle made by each axis thereof and the reference line 50 is set to about 15 degrees. The angle made by the liquid crystal alignment axis 40a, the first polarization axis 13a of the first polarizer 13, or the rubbing direction 26a of the second alignment layer 26 and the rubbing direction 24a of the first alignment layer 24 or the slow axis 25a of the retardation layer 25 is set to about 68 degrees. The angle made by the first polarization axis 13a of the first polarizer 13 and the second polarization axis 28a of the second polarizer 28 is set to 90 degrees.

In the liquid crystal device 100 having the above structure, when driving the liquid crystal device 100, the alignment state of the liquid crystal molecules is controlled by the fringe filed (electric field E) generated between the pixel electrode 9 and the common electrode 7, thereby performing color reflective display or color transmissive display. To be more specific, when reflective display is performed, the external light introduced into the liquid crystal device 100 proceeds along the pathway Lr shown in FIG. 3. That is, the external light introduced into the liquid crystal device 100 is reflected by the reflection layer 6 and reached the observer. In this case, the external light is passed through the area in which the pixel electrode 9 and the common electrode 7 and the like are formed, reflected by the reflection layer 6 positioned at the lower side of the common electrode 7 positioned in the reflective display area R, and again is passed through the pixel electrode 9 and the coloring layer 22 and the like to provide a predetermined hue and brightness. On the other hand, when transmissive display is performed, the illumination light emitted from the backlight 14 proceeds along the pathway Lt shown in FIG. 3. That is, the emitted light is passed through the pixel electrode 9, each coloring layer 22, and the like to reach the observer. In this case, the illumination light provides a predetermined hue and brightness by transmitted though the coloring layers 22 and the like. Herewith a desired color display image is viewed by the observer.

Positional Relationship of Retardation Layer and Spacer

As described above, the retardation layer 25 is formed by polymerizing and curing the liquid crystal having optical polymerization property. Accordingly, the retardation layer 25 is generally soft, so that it is difficult to form the columnar spacer 55 for setting the distance between the element substrate 91 and the color filter substrate 92 on the retardation layer 25. Even when the columnar space 35 can be formed on the retardation layer 25, it is impossible for the columnar spacer 55 to function as an original spacer due to the softness.

Considering the point, in the first embodiment of the invention, as shown in FIGS. 2 and 3, the columnar spacer 55 is provided in the area which does not overlap with the soft retardation layer 25 in plan view and at the color filter substrate 92 side. Herewith, the columnar spacer 55 can be surly formed without suffering from the difficulty of production and it becomes possible for the columnar spacer 55 to function as an original spacer. Further, by providing the columnar spacer 55 to the color filter substrate 92 side, it becomes possible to surely provide the columnar spacer 55 at a position which does not overlap with the retardation layer 25 in plan view. In a preferred example, it is preferable that the columnar spacer 55 is provided in an area in which the columnar spacer 55 can be surely supported as shown in FIGS. 2 and 3. Specifically, it is preferable that the columnar spacer 55 is provided in an area in which the thickness of the liquid crystal layer 40 is larger than the thickness dt of the liquid crystal layer 40 in the reflective display area R (for example, the area in which the thickness of the liquid crystal layer 40 is large near the transmissive display area T as shown in FIG. 3). Further, it is preferable that the columnar spacer 55 is provided at a position overlapping with the BM (light shielding layer) in plan view. Herewith, should light leakage occur due to the columnar spacer 55, the light leakage is shielded by the BM. Accordingly, the deterioration of display quality caused by the columnar spacer 55 can be prevented.

Note that no restriction is made to the setting number of the columnar spacer 55 of the liquid crystal device 100 in the invention.

Setting Position of Slit in Retardation Layer

Next, a setting position of the slit in the retardation layer at the color filter substrate 92 side will be described with reference to FIGS. 2 to FIG. 5A.

FIG. 5A is a cross sectional view taken along the line VA-VA of FIG. 2, which shows the color filter substrate 92 in the reflective display area R.

Herein, as a comparative example, suppose there is no slit (groove) 25s formed in the retardation layer 25 in FIG. 2. As shown in FIGS. 2 and 3, the retardation layer 25 has a predetermined thickness and provided at only the position corresponding to the reflective display area R. That is, the retardation layer 25 is provided in the reflective display area R at the color filter substrate 92 side in a raised manner. Accordingly, a predetermined step d1 is formed between the transmissive display area T and the reflective display area R at the color filter substrate 92 side as shown in FIG. 3. Herewith, in the manufacturing process of the color filter substrate 92, when the second alignment layer 26 is applied on the first alignment layer 24 positioned in the transmissive display area T1 the retardation layer 25 positioned in the reflective display area R and the like, due to the step d1, a part of the second alignment layer 26 applied on the retardation layer 25 positioned in the reflective display area R flows into each of the sides of the transmissive display area T1 and the transmissive display area T2 adjacent each other in the extending direction of the source line 4 with respect to the reflective display area R. It is not necessarily the case that the amount of the second alignment layer 26 flowed on the first alignment layer 24 positioned in the transmissive display area T1 and the amount of the second alignment layer 26 flowed on the first alignment layer 24 positioned in the transmissive display area T2 become the same. Accordingly, when the amount of the second alignment layer 26 flowed on the first alignment layer 24 positioned in the transmissive display area T1 and the amount of the second alignment layer 26 flowed on the first alignment layer 24 positioned in the transmissive display area T2 become uneven, the transmissive display area T in which the thickness of the second alignment layer 24 is large and the transmissive display area T in which the thickness of the second alignment layer 24 is small unfavorably exist. Consequently, thickness non-uniformity occurs in the second alignment layer 26. Accordingly, in the comparative example, there is a problem in that line display non-uniformity occurs due to the thickness non-uniformity of the second alignment layer 26.

On the basis of the point, in the first embodiment of the invention, the problem described above is solved by providing the slit (groove) 25s in the retardation layer 25 at the position corresponding to between the reflective display area R provided in any sub pixel area SG and the other reflecting displaying area R provided in the other sub pixel area SG adjacent each other in the extending direction of the second wiring 3b of the gate line 3 or the common wiring 2 with respect to the any sub pixel area SG.

That is, in the first embodiment of the invention, similarly to the comparative example, the retardation layer 25 is formed only in the reflective display area R in a raised manner, so that the step d1 is formed between the reflective display area R and the transmissive display area T as shown in FIG. 3. Accordingly, at the color filter substrate 92 side, when forming the second alignment layer 26, a part of the second alignment layer 26 applied on the retardation layer 25 provided in any reflective display area R is to be flowed to the each side of the transmissive display area T1 and the transmissive display area T2 adjacent each other in the extending direction of the source line 4 with respect to the reflective display area R. Herein, should the amount of the second alignment layer 26 flowed on the first alignment layer 24 positioned in the transmissive display area T1 and the amount of the second alignment layer 26 flowed on the first alignment layer 24 positioned in the transmissive display area T2 become uneven, the second alignment layer 26 flows from the side of the transmissive display area T1 (T2) in which the flowing amount of the second alignment layer 26 is large to the side of the transmissive display area T2 (T1) in which the flowing amount of the second alignment layer 26 is small. Consequently, the thickness of the second alignment layer 26 formed on the first alignment layer 24 positioned in the transmissive display area T1 and the thickness of the alignment layer 26 formed on the first alignment layer 24 positioned in the transmissive display area T2 become even. That is, in the first embodiment, the retardation layer 25 includes the slit (groove) 25s at the position corresponding to between the reflective display area R provided in any sub pixel area SG and the other reflecting displaying area R provided in the other sub pixel area SG adjacent each other in the extending direction of the second wiring 3b of the gate line 3 or the common wiring 2 with respect to the any sub pixel area SG. Consequently, occurrence of thickness non-uniformity of the second alignment layer 26 can be prevented by the operation of the slit 25s. Herewith, occurrence of display non-uniformity can be prevented.

Further, according to the structure, should light leakage occur due to alignment defect of the liquid crystal molecules at the position of the slit 25s caused by the shape of the slit 25s, the slit 25s is provided between the sub pixel areas SG which does not contribute for display as shown by the rectangular dotted line of FIG. 2. Accordingly, deterioration of display quality can be prevented. Further, it is preferable that the width of the slit 25s is set smaller than the width of the BM and the silt 25s is provided at the position overlapping with the BM in plan view. The reason is that when light leakage or the like occurs due to the shape of the slit 25s of the retardation layer 25, the light leakage is shielded by the BM, so that deterioration of display quality can be prevented.

Note that, in the invention, the setting number of the slit 25s of the retardation layer 25 is not limited. For example, as shown in FIG. 2, an area in which the slit 25s is provided and an area in which the slit 25s is not provided may exist between sub pixel areas SG adjacent each other in the extending direction of the second wiring 3b of the gate line 3. Further, in the invention, as shown in FIG. 5B corresponding to FIG. 5A, the slit 25s of the retardation layer 25 is not required to penetrate the retardation layer 25 in the thickness direction thereof.

Positional Relationship between Spacer and Slit of Retardation Layer

As described above, the columnar spacer 55 is provided at the area not overlapping with the soft retardation layer 25 in plan view and at the color filter substrate side 92. Herein, when the columnar spacer 55 is provided near the slit 25s of the retardation layer 25 or on the extended line of the slit 25s in the extending direction, when forming the second alignment layer 26 of the color filter substrate 92, there is fear in that the flow of the second alignment layer 26 through the slit 25s positioned between the transmissive display area T1 and the transmissive display area T2 provided at the positions to sandwich the reflective display area R is stopped by the columnar spacer 55.

Consequently, in order to prevent such a problem, in the first embodiment of the invention, the columnar spacer 55 is provided at the position most apart from the slit 25s of the retardation layer 25 in any of the sub pixel area SG as shown in FIG. 2. In a preferred example, it is preferable that the columnar spacer 55 is not positioned on the extended line Ls of the slit 25s of the retardation layer 25 in the extending direction as shown in FIG. 2. Herewith, when forming the second alignment layer 26, it can be prevented that the columnar spacer 55 stops the flow of the second alignment layer 26 through the slit 25s of the retardation layer 25 between the transmissive display areas T1 and T2 adjacent each other. As a result, occurrence of thickness non-uniformity of the second alignment layer 26 can be prevented.

Second Embodiment

Figure 6A:
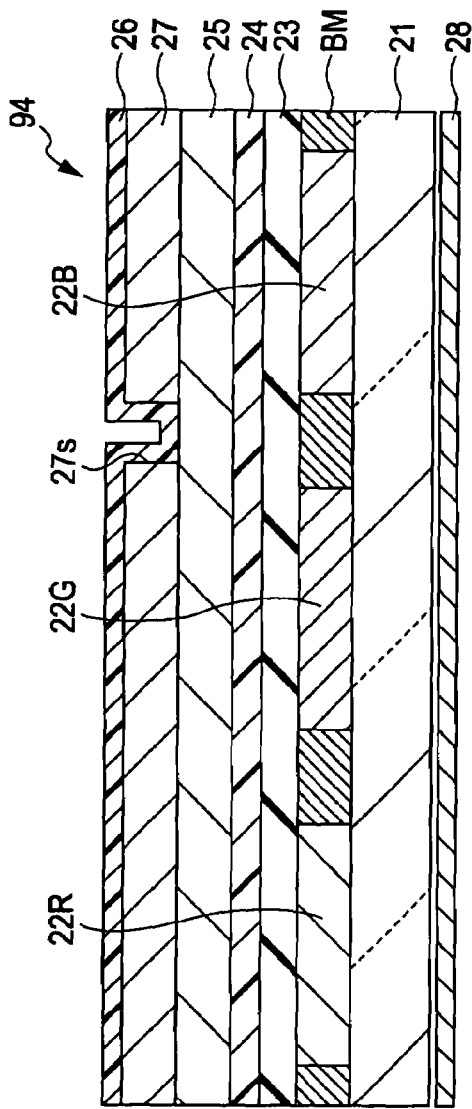
FIGS. 6A and 6B are each a cross sectional view corresponding to a reflective display area of a color filter substrate of the second embodiment.

Next, a structure of a color filter substrate 94 according to a second embodiment of the invention will be described with reference to FIG. 6A and the like. FIG. 6A is a cross sectional view showing the color filter substrate 94 according to the second embodiment of the invention corresponding to FIG. 5A.

When comparing the second embodiment with the first embodiment, in the second embodiment, a protection layer 27 is further provided between the retardation layer 25 and the second alignment layer 26 in the reflective display area R at the color filter substrate 94 side and the pint only is different from the first embodiment in the structure. Accordingly, the same reference numeral is used to denote the same element as that in the first embodiment and further description thereof will be omitted.

Generally, the thickness of the second alignment layer 26 formed on the retardation layer 25 is thin, so that there is a fear in that an ingredient contained in the retardation layer 25 is dissolved to flow to the liquid crystal layer 40 side through the second alignment layer 26 to deteriorate display quality due to the thickness. Further, as described above, the retardation layer 25 is formed by polymerizing and curing the liquid crystal having optical polymerization property, so that the retardation layer 25 is generally soft. Accordingly the retardation layer 25 is extremely week to mechanical impact or the like generated when subjecting a rubbing process to the surface of the second alignment layer 26.

Consequently, in the second embodiment, in order to solve the problems at once, a protection layer 27 having a predetermined thickness is provided between the retardation layer 25 and the second alignment layer 26. Herein, as for a forming material of the protection layer 27, for example, there is included a transparent resin such as acrylic resin. According to the structure, by the operation of the protection layer 27 as a barrier, it can be prevented that an ingredient included in the retardation layer 25 is dissolved to flow to the liquid crystal layer 40 side thought the second alignment layer 26. Herewith, the deterioration of display quality can be prevented. Further, by the operation of the protection layer 27 as a reinforcement layer, the retardation layer 25 can be protected from mechanical impact or the like generated when subjecting a rubbing process on the surface of the second alignment layer 26.

Further, in the second embodiment, in FIG. 2, a slit (groove) 27s is provided at the position corresponding to between the reflective display area R provided in any sub pixel area SG and the other reflective display area R provided in the other sub pixel area SG adjacent each other in the extending direction of the second siring 3b of the gate line 3 or the common wiring 2 with respect to the any sub pixel area SG. Herein, the planner positional relationship of each element of the both liquid crystal device is the same except the above difference in the second embodiment and the first embodiment. Herewith, the slit 27s of the protection layer 27 has the same function as that of the slit 25s of the retardation layer 25, so that occurrence of thickness non-uniformity of the second alignment layer 26 can be prevented by the operation of the slit 27s. Accordingly, occurrence of display non-uniformity can be prevented.

Further, according to the structure, should light leakage occur due to alignment defect of the liquid crystal molecules at the position of the slit 27s caused by the shape of the slit 27s, the slit 27s is provided between the sub pixel areas SG which does not contribute for display as shown by the rectangular dotted line of FIG. 2. Accordingly, deterioration of display quality can be prevented. Further, it is preferable that the width of the slit 27s is set smaller than the width of the BM and the silt 27s is provided at the position overlapping with the BM in plan view. The reason is that when light leakage or the like occurs due to the shape of the slit 27s of the protection layer 27, the light leakage is shielded by the BM, so that deterioration of display quality can be prevented.

Figure 6B:
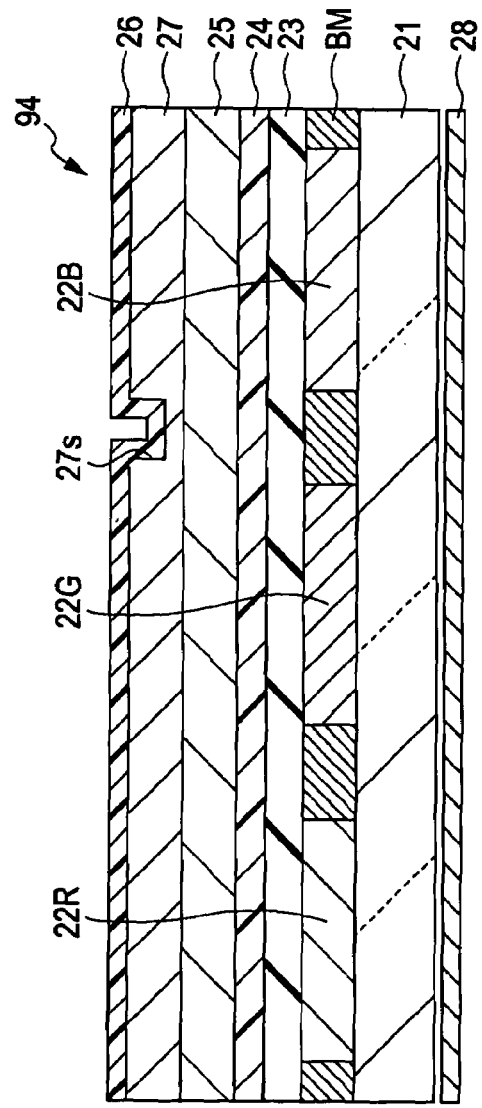

Note that, in the invention, the setting number of the slit 27s of the protection layer 27 is not limited. For example, as shown in FIG. 2, an area in which the slit 27s is provided and an area in which the slit 27s is not provided may exist between sub pixel areas SG adjacent each other in the extending direction of the second wiring 3b of the gate line 3. Further, in the invention, as shown in FIG. 6B corresponding to FIG. 6A, it is preferable that the slit 27s of the protection layer 27 does not penetrate the protection layer 27 in the thickness direction thereof. Herewith, the protection layer 27 as a barrier exists between the second alignment layer 26 and the retardation layer 25 corresponding to the position of the slit 27s. This further prevents that an ingredient contained in the retardation layer 25 is dissolved to flow to the liquid crystal layer 40 side through the second alignment layer 26. Further, in the invention, the protection layer 27 may be formed not only on the retardation layer 25 positioned in the reflective display area R but also formed on from the retardation layer 25 positioned in the reflective display area R to the first alignment layer 24 positioned in the transmissive display area T.

Positional Relationship between Spacer and Slit of Protection Layer

The columnar spacer 55 is provided at the area not overlapping with the soft retardation layer 25 in plan view and at the color filter substrate side 94. Herein, when the columnar spacer 55 is provided near the slit 27s of the protection layer 27 or on the extended line of the slit 27s in the extending direction, when forming the second alignment layer 26 of the color filter substrate 94, there is fear in that the flow of the second alignment layer 26 through the slit 27s positioned between the transmissive display area T1 and the transmissive display area T2 provided at the positions to sandwich the reflective display area R is stopped by the columnar spacer 55.

Consequently, in order to prevent such a problem, in the second embodiment of the invention, the columnar spacer 55 is provided at the position most apart from the slit 27s of the protection layer 27 in any of the sub pixel area SG as shown in FIG. 2. In a preferred example, it is preferable that the columnar spacer 55 is not positioned on the extended line Ls of the slit 27s of the protection layer 27 in the extending direction as shown in FIG. 2. Herewith, when forming the second alignment layer 26, it can be prevented that the columnar spacer 55 stops the flow of the second alignment layer 26 through the slit 27s of the protection layer 27 between the transmissive display areas T1 and T2 adjacent each other. As a result, occurrence of thickness non-uniformity of the second alignment layer 26 can be prevented.

Modifications

In the various embodiments described above, the pixel electrode 9 is constituted to have a plurality of closed slits (openings) 9s in plan view. However, the invention is not limited to this and the pixel electrode 9 may be formed in a comb teeth shape. When the pixel electrode 9 is formed into a comb teeth shape, the distal ends of the comb teeth of the pixel electrode 9 can be formed so as to come more close to the side of the other pixel electrode 9 adjacent in the extending direction of the second wiring 3b of the gate line 3. This may improve the aperture ratio. However, the vicinity of the distal ends of the comb teeth are opened, so that if the vicinity of each of the distal ends of the comb teeth is formed to extend near the slit 25s of the retardation layer 25 or the slit 27s of the protection layer 27, the vicinity of the distal ends of some of the comb teeth positioned near the slit 25s or 27s becomes susceptible to an influence of a needles electric field E generated from the side of the other pixel electrode 9 adjacent thereto. Consequently, there may occur a problem in that discrenation (alignment abnormality of liquid crystal molecules) occurs and light leakage or the like occurs at the vicinity of the distal ends of some of the comb teeth positioned near the slit 25s or 27s.

Figure 7:
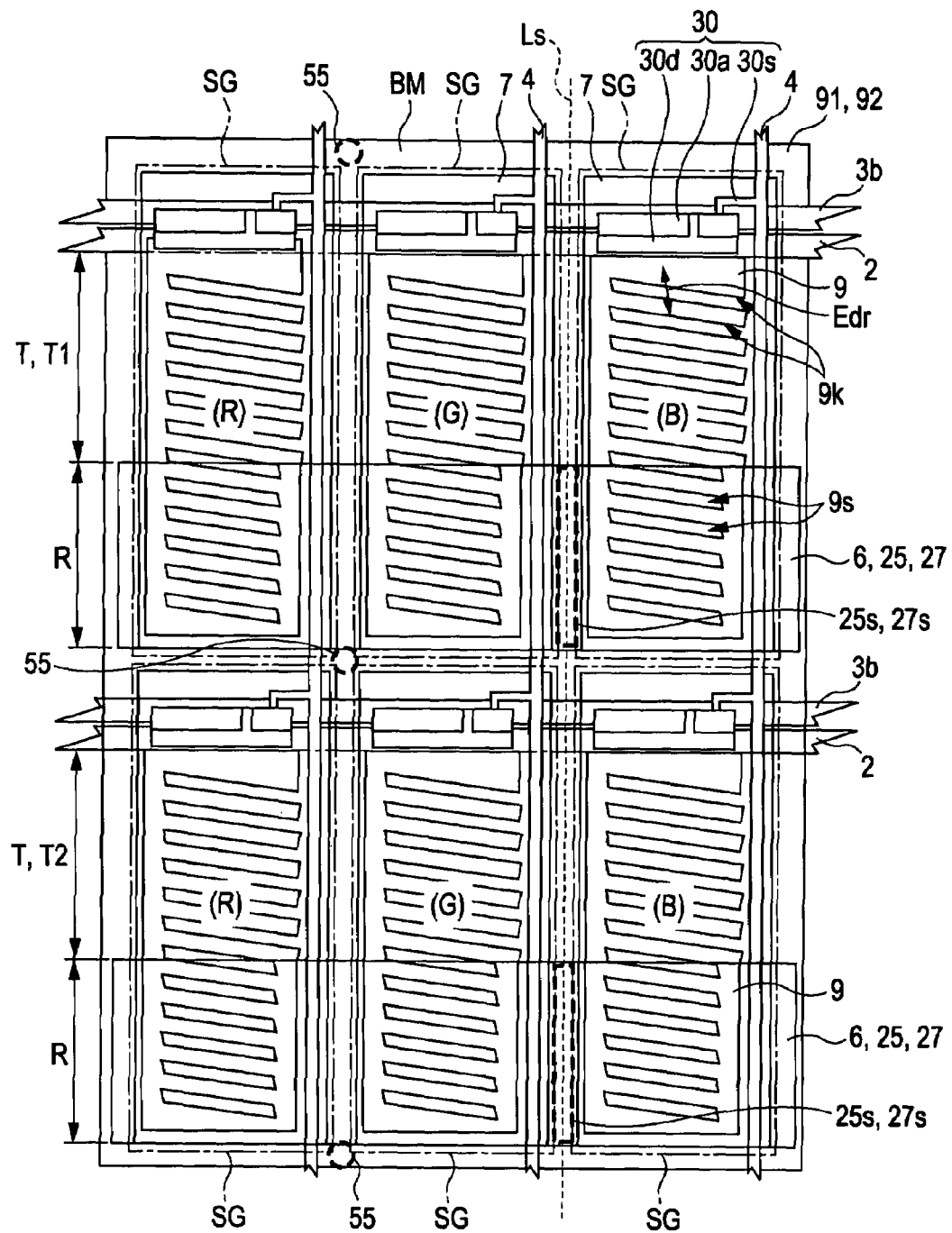
FIG. 7 is a plan view showing a pixel structure of a liquid crystal device of a modification of the invention.

Consequently, in a modification of the invention, as shown in FIG. 7 corresponding to FIG. 2, slits (openings) 9s closed in plan view are provided at the part of the pixel electrode 9 positioned in the reflective display area R which is susceptible to the influence of the discrenation to form a structure which is insusceptible to the influence of the discrenation and cutouts 9k are provided at the portion of the pixel electrode 9 positioned in the transmissive display area T which is insusceptible to the influence of the discrenation and the pixel electrode 9 positioned in the transmissive display area T is formed into a comb teeth shape. Herewith, influence of the discrenation is reduced and the aperture ratio is improved.

Further, in the above various embodiments, the columnar spacer 55 is provided at the area not overlapping with the retardation layer 25 in plan view at the color filter substrate 92 or 94 side. However, the position of the columnar spacer 55 is not limited to this and the columnar spacer 55 may be provided at the area not overlapping with the retardation layer 25 in plan view at the element substrate 91 side in the invention.

Further, in the above various embodiments, the coloring layer 22 of each color of R, G, B has a rectangular plan shape and is provided at the color filter substrate 92 or 94 side and at the position corresponding to each sub pixel area SG. Further, the BM (light shielding layer) is provided at the position blocking out each sub pixel area SG corresponding to the each color of R, G, B, and the columnar spacer 55 is provided at the position overlapping with the BM in plan view. The invention is not limited to this and the coloring layer 22 of each color of R, G, B may have a stripe shape extending in the extending direction of the source line 4 and may be provided at the position overlapping with the plurality of sub pixel areas SG arranged in the extending direction of the source line 4 in plan view. In this case, a BM (light shielding layer) having a linear shape extending in the extending direction of the source line 4 is provided between the sub pixel areas SG adjacent each other in the extending direction of the second wiring 3b of the gate line 3 or the common wiring 2 and the columnar spacer 55 is provided at the position overlapping with the BM having a linear shape in plan view.

Further, in the above various embodiments, the invention is applied to the liquid crystal device having the a Si-type TFT element 30 as a switching element. However, the invention is not limited to this and may be applied to a liquid crystal device having a two-terminal type nonlinear element represented by a TFD (Thin Film Diode) element.

Further, in the various embodiments described above, the invention is applied to the liquid crystal device having an FFS system as an example of a horizontal electric field system. However, the invention is not limited to this and may be applied to a liquid crystal device having an IPS (In-Plane Switching) system as another example of a horizontal electric field system.

Further, various modifications may be made without departing from the spirit of the invention.

Electronic Apparatus

Next, a concrete example of an electronic apparatus equipped with the liquid crystal device 100 according to the first embodiment (or the second embodiment) will be described with reference to FIGS. 8A and 8B.

First, an example in which the liquid crystal device 100 is applied to a display unit of a portable personal computer (so called note type personal computer) will be described. FIG. 8A is a perspective view showing a structure of the personal computer. As shown in FIG. 8A, the personal computer 710 is equipped with a main body unit 712 equipped with a keyboard 711 and a display unit 713 to which the liquid crystal device 100 according to the invention is applied.

Next, an example in which the liquid crystal device 100 is applied to a display unit of a mobile phone will be described. FIG. 8B is a perspective view showing a structure of the mobile phone. As shown in FIG. 8B, the mobile phone 720 is equipped with an ear piece 722, a mouth piece 723, and a display unit 724 in addition to a plurality of operation buttons 721. The liquid crystal device 100 according to the invention is applied to the display unit 724.

Figure 8A:
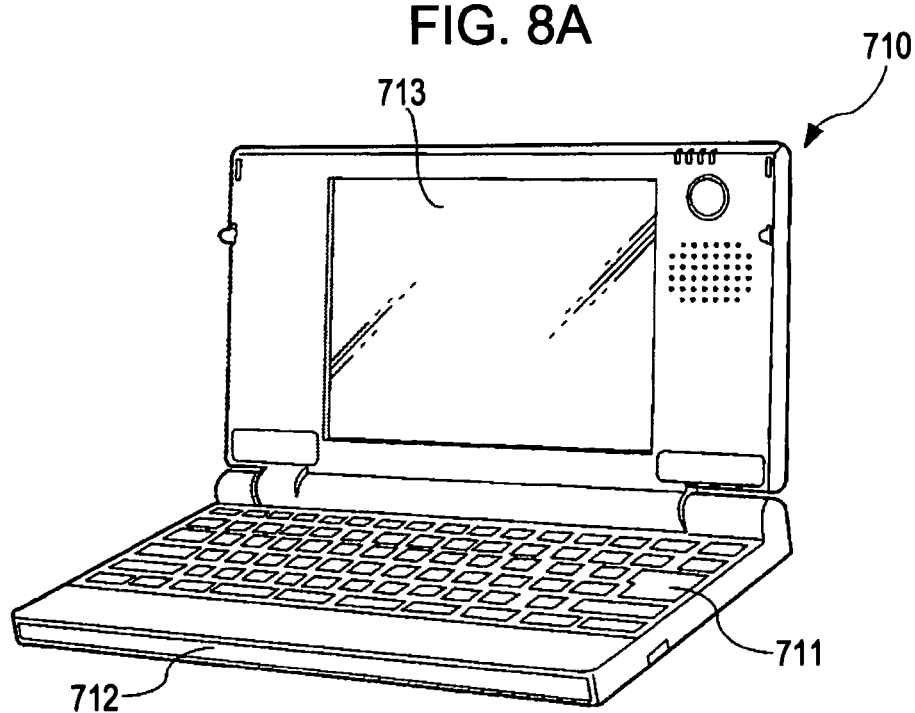
FIGS. 8A and 8B are each a diagram showing an example of an electronic apparatus equipped with the liquid crystal device of the invention.
Figure 8B:
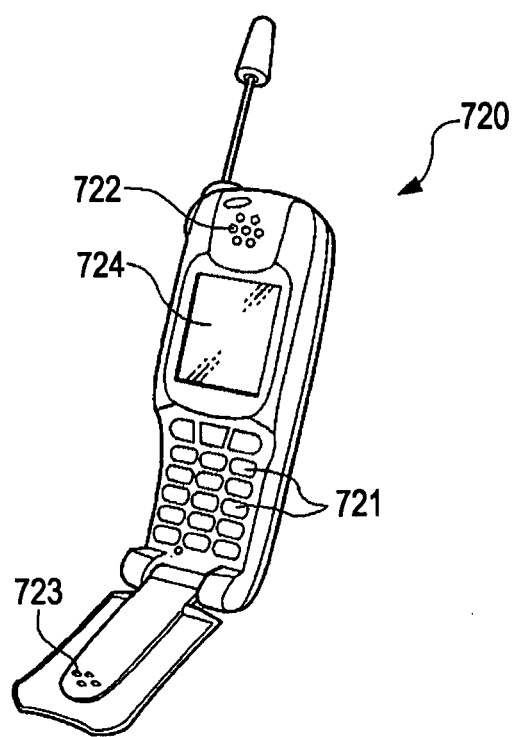

Note that as for an electronic apparatus to which the liquid crystal device 100 according to the invention can be applied, except for the personal computer shown in FIG. 8A and the mobile phone shown in FIG. 8B, there are included a liquid crystal television, a viewfinder-type or monitor-direct-view type video tape recorder, a car navigation device, a pager, an electronic organizer, a calculator, a word processor, a work station, a videophone, a POS terminal, a digital still camera, and the like.

What is claimed is:

1. A liquid crystal device, wherein
the liquid crystal device includes a pair of first and second substrates which sandwich a liquid crystal layer, the first substrate includes a first electrode, a second electrode for generating an electric field between with the first electrode, and a reflection layer extending in a predetermined direction, and the second substrate includes a plurality of coloring layers and a retardation layer that gives a retardation of ½ wavelength, a transmissive display area for performing transmissive display by transmitting the light introduced into the liquid crystal layer from the first substrate side to the second substrate side and a reflective display area for performing reflective display by reflecting the light introduced into the liquid crystal layer form the second substrate side to the second substrate side by the reflection layer are provided in a sub pixel area corresponding to the area in which the first electrode of the first substrate and the second substrate are overlapped with each other, a thickness of the liquid crystal layer in the transmissive display area is set at least larger than a thickness of the liquid crystal layer in the reflective display area, the liquid crystal layer in the reflective display area gives a retardation of ¼ wavelength and the liquid crystal layer in the transmissive display area gives a retardation of ½ wavelength, a first polarizer having a first optical axis is provided on the first substrate at the side opposite to the liquid crystal layer side and a second polarizer having a second optical axis perpendicular to the first optical axis is provided on the second substrate at the side opposite to the liquid crystal layer side, any one of the first optical axis of the first polarizer and the second optical axis of the second polarizer is set in parallel to an alignment axis of liquid crystal molecules of the liquid crystal layer, the retardation layer is provided between the liquid crystal layer and the second polarizer and at a position at least corresponding to the reflective display area, the retardation layer extending in a predetermined direction corresponding to the predetermined direction of the reflection layer, a spacer for setting a distance between the first substrate and the second substrate is provided at any one of the first substrate and the second substrate side and in the area not overlapping with the retardation layer in plan view, a light shielding layer is provided at the second substrate side and at least between the sub pixel areas adjacent each other in a row direction, and the spacer is provided at a position overlapping with the light shielding layer in plan view and the light shielding layer does not extend into a region over the retardation layer, and wherein a slit is located on the second substrate in the retardation layer at a position corresponding to between the reflective display area provided in any of the sub pixel area and the other reflective display area provided in the other sub pixel area adjacent each other in a predetermined direction with respect to the any of the sub pixel area.

2. The liquid crystal device according to claim 1, wherein the spacer is provided at the second substrate side.

3. The liquid crystal device according to claim 1, wherein the spacer is provided in an area in which the thickness of the liquid crystal layer is larger than the thickness of the liquid crystal layer in the reflective display area.

4. The liquid crystal device according to claim 1, wherein, the slit is provided between some of the sub pixel areas adjacent each other in the predetermined direction and the slit is provided between some of the sub pixel areas adjacent each other in the predetermined direction in the retardation layer.

5. The liquid crystal device according to claim 1, wherein the spacer is provided at the position most apart from the slit in any of the sub pixel area.

6. The liquid crystal device according to claim 5, wherein the spacer is not positioned on an extended line of the slit in the extending direction of the slit.

7. The liquid crystal device according to claim 1, wherein the slit is extended into the retardation layer in the predetermined direction of the retardation layer.

8. A liquid crystal device, wherein
the liquid crystal device includes a pair of first and second substrates which sandwich a liquid crystal layer, the first substrate includes a first electrode, a second electrode for generating an electric field between with the first electrode, and a reflection layer, and the second substrate includes a plurality of coloring layers and a retardation layer that gives a retardation of ½ wavelength, a transmissive display area for performing transmissive display by transmitting the light introduced into the liquid crystal layer from the first substrate side to the second substrate side and a reflective display area for performing reflective display by reflecting the light introduced into the liquid crystal layer form the second substrate side to the second substrate side by the reflection layer are provided in a sub pixel area corresponding to the area in which the first electrode of the first substrate and the second substrate are overlapped with each other, a thickness of the liquid crystal layer in the transmissive display area is set at least larger than a thickness of the liquid crystal layer in the reflective display area, the liquid crystal layer in the reflective display area gives a retardation of ¼ wavelength and the liquid crystal layer in the transmissive display area gives a retardation of ½ wavelength, a first polarizer having a first optical axis is provided on the first substrate at the side opposite to the liquid crystal layer side and a second polarizer having a second optical axis perpendicular to the first optical axis is provided on the second substrate at the side opposite to the liquid crystal layer side, any one of the first optical axis of the first polarizer and the second optical axis of the second polarizer is set in parallel to an alignment axis of liquid crystal molecules of the liquid crystal layer, wherein the retardation layer is provided between the liquid crystal layer and the second polarizer and at a position at least corresponding to the reflective display area, a light shielding layer is provided at the second substrate side and at least between the sub pixel areas adjacent each other in a row direction, and the spacer is provided at a position overlapping with the light shielding layer in plan view and the light shielding layer does not extend into a region over the retardation layer, and the retardation layer includes a slit located on the second substrate at a position corresponding to between the reflective display area provided in any of the sub pixel area and the other reflective display area provided in the other sub pixel area adjacent each other in a predetermined direction with respect to the any of the sub pixel area.

9. An electronic apparatus comprising the liquid crystal device according to claim 1 as a display unit.

* * * * *